United States Patent [19]
Moser et al.

[11] Patent Number: 6,083,738
[45] Date of Patent: *Jul. 4, 2000

[54] COMPOST DECONTAMINATION OF SOIL CONTAMINATED WITH PCB USING AEROBIC AND ANAEROBIC MICROORGANISMS

[75] Inventors: Guy P. Moser, Guelph; Neil C. C. Gray; David J. Gannon, both of Oakville, all of Canada

[73] Assignee: Zeneca, Inc., Wilmington, Del.

[*] Notice: This patent is subject to a terminal disclaimer.

[21] Appl. No.: 09/080,660

[22] Filed: May 18, 1998

Related U.S. Application Data

[63] Continuation-in-part of application No. 08/742,508, Nov. 1, 1996, Pat. No. 5,902,744.

[51] Int. Cl.[7] .............................. B09B 3/00; C07G 17/00; C12N 1/00; D06M 16/00
[52] U.S. Cl. ............................. 435/262.5; 71/15; 71/21; 71/25; 71/903; 435/170; 435/264; 435/267; 435/822; 588/207
[58] Field of Search ................................. 71/15, 21, 25, 71/903; 435/170, 262.5, 264, 267, 822; 588/207

[56] References Cited

U.S. PATENT DOCUMENTS

| | | | |
|---|---|---|---|
| 5,593,888 | 1/1997 | Gray et al. | 435/262.5 |
| 5,660,612 | 8/1997 | Bernier et al. | 71/15 |
| 5,711,020 | 1/1998 | Wolfe et al. | 588/203 |
| 5,824,541 | 10/1998 | Horn et al. | 435/262.5 |

OTHER PUBLICATIONS

"Principles of Composting" Guele; The Biocycle to the Art in Science of Composting; Journal of Waste Recycling, the I J Press Inc; 1991, p. 14–271 "Anaerobic DDT Biodegration".

Environment of Application of Surfactants and the Low Oxidation Potential Affhel Experimental Microbiology, Des. 1931, You et al p. 1.35; Anerobic DDT Degration of Contaminated Soil by Mixed Consortia and Enhancement by Surfactant in Shurg Reactor, You et al. Web Environmental Fedouton, Oct. 1994 p. 635–645.

Primary Examiner—David M. Naff
Assistant Examiner—Deborah K. Ware
Attorney, Agent, or Firm—Robert J. Reichert

[57] ABSTRACT

The present invention provides a process of decontaminating, by composting under specific conditions, soil and/or sediments containing toxic contaminants of PCB. The process is carried out by converting the contaminants into harmless materials. The process includes the step of affecting a solid compost mixture during composting with a redox potential below negative 200 mV (millivolts). Further, the process includes several steps which are repeated until complete degradation is achieved. Other processes for degrading compounds such as chlordane, dieldrin, toxaphene, aldrin, endrin, and heptachlorepoxide as well as polychlorinated benzenes are also disclosed.

9 Claims, No Drawings

COMPOST DECONTAMINATION OF SOIL CONTAMINATED WITH PCB USING AEROBIC AND ANAEROBIC MICROORGANISMS

This application is a continuation-in-part of application Ser. No. 08/742,508 filed Nov. 1, 1996, now U.S. Pat. No. 5,902,744.

BACKGROUND OF THE INVENTION

This invention relates to a controlled microorganism degradation process for decontaminating soil or sediments contaminated with one or more PCB Polychlorinated biphenyls (PCBs) have been produced as complex mixtures for a variety of uses, including dielectric fluids in capacitors and ransformers. Arochlor PCBs (Monsanto Corporation) were marketed for use in transfrmeers, capacitors, printing inks,. Paints, de-dusting agents, pesticides and many other uses. PCBs in general are mixtures of several compounds, called congeners, in which one to ten chlorine atoms are attached to biphenyl. They are often described by the wt. % chlorine contained, e.g. Archlor 1221, 1242 and 12260 contain 21, 42, and 60 wt. % chlorine.

Numerous land sites exist that are contaminated, and have been contaminated for decades, with the highly toxic PCBs. Many of these sites are unusable and will remain unusable until some economical process becomes available for large scale decontamination of the soil of such sites.

Zeneca Corp. U.S. Pat. Nos. 5,660,612 and 5,660,613 disclose the remediation of soil contaminated with the non-aromatic pesticide DDT by anaerobic composting followed aerobic composting under specific conditions of water content, temperature, redox potential and the presence of unacclimated soil—indigenous anaerobic and aerobic microbes capable of transforming DDT into harmless materials.

We have tried this method in attempts to decontaminate soil containing various contaminants other than DDT. While this method has been found successful with a limited number of specific contaminants, it was unsuccessful for many contaminants. There appears to be no reliable way to predict which compounds will be effectively decomposed by this method, and particularly no reason to expect that it would be successful, as with DDT, in decontaminating soil containing the chemically different aromatic PCBs.

Several researchers have attempted to degrade PCBs by complex composting in aqueous slurries under a sequence of anaerobic and aerobic treatments requiring the addition of separate inoculants before each anaerobic and aerobic treatment, and the addition of byphenyl to enhance the degradation. PCB decomposition was achieved over an excessively long time. See "Sequential Anaerobic-Aerobic Biodegradation of PCBs in Soil Slurry Microcosms", B. S. Evans, C. A. Dudley and K. T. Klasson, 1996, Applied Biochemistry and Biotechnology, Vol. 57/58, 885–894.

The present invention does not require two stages of composting treatment, two separate microbe inoculants, or a slurry environment.

SUMMARY OF THE INVENTION

The present invention is a process of decontaminating soil and/or sediments containing one or more PCB contaminants by converting the contaminant into harmless materials. This process is capable of decontaminating the soil to whatever extent desired, either partial decontamination or complete remediation.

The process comprises preparing an inoculant that contains populations of anaerobic and aerobic microbes that are viable throughout the anaerobic and aerobic stages of the entire process, which microbes are capable of degrading the PCB contaminants into harmless materials. The soil is then treated with these microbes by solid state anaerobic/aerobic composting as hereinafter described.

The inoculant is prepared by mixing a small amount of the PCB contaminants that are present in the soil to be decontaminated, preferably from 10 to 100 mg/Kg, of the final inoculant mixture, with a conventional highly nutritious aqueous formulation normally referred to as a heterotropic medium. Desirably some soil is added to this mixture, which is maintained liquid. The liquid mixture is then stored at a temperature from about 20 degrees C. to 30 degrees C. for about 6 to 10 weeks. During this time acclimated indigenous anaerobic and aerobic microbes form that are capable of transforming the specific PCB contaminants into harmless materials.

The decontamination treatment comprises mixing the PCB-contaminated soil with amendment material to form a solid compost mixture containing organic nutrient materials; adding to the compost mixture 1 to 20% v/v of the inoculant to the compost mixture; maintaining the temperature in the range of about 20 t 65 degrees C. and the water holding capacity (WHC) of said compost mixture from 40 to 100%; during this composting maintaining the redox potential of the compost mixture below negative 200 mV until a significant amount of contaminant is degraded, mostly to toxic PCB metabolites; thereafter raising the redox potential of the compost mixture above positive 100 mV until a further significant amount of contaminant is degraded. This sequence of stages of PCB's was polychlorinated biphenyls anaerobic/aerobic (negative/positive redox potential) can be repeated as often as necessary to yield soil or sediment containing little or no contaminant "mV" means millivolt.

DEFINITIONS

The term "composting" as used herein means transforming by degradation contaminants in the soil and/or sediment to harmless materials utilizing biological activity, the process being carried out in the solid state in the presence of organic nutrient material.

"Amendment", "amendment material" and "soil amendment material" mean material comprising the organic nutrient, and other materials if needed not initially in the soil support the required microbial populations that is added to the soil to be decontaminated. Other ingredient that may be included in the amendment are a reducing agent or surfactant.

"Contaminants" means one or more PCB and toxic metabolites from the degradation of PCB.

"Degrade", when used with PCB and its metabolites, means the remove one more chlorine atoms and/or cleave the benzene ring.

"Harmless materials" means materials that are unobjectionable in the concentrations present in soil or sediment for its intended use.

"Toxic metabolites of PCB" means degradation products of PCBs from which one or more chlorine atoms have been removed from PCB molecule, but the PCB has not been completely degraded to harmless materials.

"Decontamination" means transforming the contaminants to harmless materials, including biodegrading the contaminants and/or binding the contaminants to soil or other material.

"Remediation" means decontamination to an unobjectionable level of the contaminants in the soil/sediment for the intended use of the soil/sediment.

"Soil" means earth, i.e. humus, sand and particulate rock, and includes sediment from above and beneath he surface of the water.

DESCRIPTION OF THE INVENTION

In the degradation steps of the process of the present invention, the soil to be decontaminated must contain throughout the process appropriate types of viable microbes capable of degrading the contaminants. Both anaerobic and aerobic microbes must be present. These microbes must be viable under both the anaerobic conditions to which they will be subjected during the present process. The microbes normally are bacteria, fungi, actinomycetes, and to a lesser extent protozoa. As aforementioned the first step in the present invention is to prepare an appropriate inoculant from microbes, normally microbes initially present in the soil to be treated, i.e. indigenous microbes, that have been adequately acclimated to the contaminants that are to be subject to decontamination. Additional active microbes can be recycled from previously decontaminated soil.

In the practice of the present invention a solid compost mixture is prepared by mixing appropriate soil amendment into the soil to be decontaminated to give a total amount of amendment material of at least 10%, and up to about 95% by weight of the mixture, and preferably from about 30% to 70% by weight of amendment material, some of which may already be present in the soil. The soil amendment material comprises a conventional source of organic nutrients for the microbes during composting. The preferred amendment nutrient materials are agricultural waste and municipal waste sludge, preferably a manure such as horse, cow, sheep, turkey, chicken or fish manure, or activated sludge. Alfalfa, hay, sawdust, peat, grass and other bulking materials may also be present in the compost mixture, originate in manure or be specifically added. The inoculant is added to the compost mixture in sufficient quantities to significantly influence the microbial population. At least 1% inoculant v/v is needed to be added t the compost mixture, and 1–20% is preferred.

In some cases it may be desirable to include in the soil amendment a surfactant to render the contaminants more available to biological degradation. Suitable surfactants include polysorbates, octoxynols, anionic alkyl sulfates, anionic alkyl aryl sulfates and ethoxylates. Examples of suitable surfactants include "Tween" nonionic surfactants commercially available from ICI Americas, Inc., "Triton" nonionic surfactants commercially available from Union Carbide and "DAWN' detergent commercially available from Procter & Gamble. A suitable mixture of surfactants is "Triton" and "DAWN". The amendment material may also contain, or be supplemented with, liquid or solid organic or inorganic nutrients. Organic materials high in nitrates and phosphates are normally used.

The compost mixture is maintained in a moist but solid state. Throughout the process the moisture level is maintained at not greater than 100% of the mixture water holding capacity (WHC), preferably in the range of about 40 to 70% WHC.

After mixing, biological degradation of organic matter in the mixture starts, raising the temperature and depleting the oxygen to an anaerobic condition. The temperature of the mixture is thereafter maintained within the range of about 20–65° C. This is easily done by controlled air movement through the compost mixture (e.g. through pipes) and/or by the addition of nutrient material. Below about 20° C., the biodegradation proceeds uneconomically slowly; above about 65° C. excessive microbe kill or inactivity may take place. The preferred temperature range is within about 20–50° C. It is essential that viable anaerobic degradation microbes be maintained during the process of the present invention.

During the anaerobic composting a low redox potential level is maintained in the compost mixture, at least about negative 200 mV, and preferably in the range of negative 300 mV to 500 mV. This level has been found to be optimum for the anaerobic process. The redox potential level can be maintained within this range by moist air movement through the compost and/or by he addition of conventional reducing agents such as sulfite and acetate reducing compounds.

The anaerobic composing is continued until a significant amount of the contaminant is degraded. This can be determined by analysis.

After the contaminants content of the soil/manure mixture is decreased significantly by the anaerobic composting, the mixture is treated with an aerobic composting step. This is done by oxygenating the compost mixture by any suitable means, preferably by air fed through and/or mixed with the mixture to achieve aerobic conditions. Sufficient oxygenation is applied for the redox potential level during the aerobic treatment to be maintained above about positive 100 mV. The aerobic conditions activate further degradation, yielding harmless materials. The aerobic degradation step is continued until a significant amount of the contaminants is degraded by the aerobic treatment.

In some cases, the desired degree of biodegradation of the contaminants for acceptable remediation will not be achieved in the first anaerobic/aerobic treatment sequence. In these cases the sequences is repeated one or more times as needed for acceptable soil decontamination. Substantially complete remediation is achievable by this multi-sequence process. If an anaerobic/aerobic process is used, it necessary that there be present a sufficient population of aerobic microbes be present during the aerobic composting. The aerobic microbes are present in the inoculant initially added and are viable throughout the entire process of anaerobic/aerobic treatment.

A desirable feature of the present invention is that the degrading microbes are maintained viable throughout the process, so that it is not essential that microbes be supplemented. However, it may be desirable to add more amendment materials, manure, or other conventional fermentation ingredients, primarily to supplement the organic feed supply and also to introduce more bulking agent.

As aforementioned, maintaining the proper redox potential level of the compost mixture in the anaerobic composting is necessary for effective practice of the present process. The appropriate redox potential level can be maintained by the addition of conventional nutrient materials and/or reducing agents such as sulfite and/or acetate compounds. Absolute anaerobic conditions are needed (although short localized excursions can be expected). For the purpose of the present invention, a redox potential level of less than about negative 200 mV is required for the anaerobic composting. The preferred redox potential level is in the range of about negative 300 to 500 mV.

During composting high microbe counts are present, preferably up to 10 to the eighth power aerobic colony forming units (cfu) per gram, as measured by standard plate count techniques, and up to 10 to the sixth power anaerobic cfu/g. These microbe counts of course include microbes other than those that degrade the contaminants.

In practice the present process is conducted in a compost container, normally in a container cell or windrow. The soil to be treated can be analyzed and composted in the laboratory to determine optimum conditions of amendment composition, and anaerobic treatment time.

The following Examples are illustrative of the preferred practice of the present invention.

EXAMPLE 1

An inoculant is prepared for use in decontamination of a Tampa landsite soil. A sample of the soil contaminated by PCB by mixing together 125 m. of dilute hererotrophic* medium, 625 micro liters of a 2 mg/mL methanol solution of Arochlor 1260 PCB and 50 g of an uncontaminated soil. The inoculant is then stored under anaerobic conditions for 6 weeks at 22° C. in an anaerobic chamber.

Dilute heterotrophic medium consists of:

| Glucose | 0.1 g/L | $CaCl_2 \cdot 2H_2O$ | 0.07 g/L |
|---|---|---|---|
| Yeast extract | 0.1 g/L | MOPS | 0.1 g/L |
| Peptone | 0.05 g/L | Vitamins (BME 100X) | 1.0 mL/L |
| Tritone | 0.05 g/L | | |
| $MgSO_4 \cdot 7H_2O$ | 0.6 g/L | Ho-Le's Minerals | 1.0 mL/L |
| | | 2M phosphate sol,n | 1.0 mL/L-pH 7.53 |

1 kg (60 ml) of soil containing approximately 25 ppm of "Arochlor" 1260 is then mixed with a compost mixture containing 400 mL of cattle manure and the above described 50 mL of inoculant. Duplicate samples of the mixture are composted anaerobically in a chamber for 6 weeks. The water WHC, redox potential and temperature of the anaerobic compost mixture during this time averages about 70%, below 250 mV, and 22 degrees C. respectively. Significant degradation of the PCB takes place.

EXAMPLES 2–8

The procedure of Example 1 is followed except that the type of PCB, the amendment (compost mixture) ingredients, the composting times are as indicated in the following Table. In each example the inoculant is prepared by the following the procedure of Example 1.

TABLE

Examples 2 to 8

| Ex. No. | PCB | Amendment | Anaerobic/aerobic Times |
|---|---|---|---|
| 2 | 1221 | horse manure-20% | 4/2 weeks |
| 3 | 1242 | chicken manure-35% | 5/1 weeks |
| 4 | 1260 | municipal sludge-80% | 5/3 weeks |
| 5 | 1242 | cow manure-60% | 4/3 weeks |
| 6 | 1260 | 30% sludge, 20% straw | 6/2 weeks |
| 7 | 1221 | fish manure, 80% | 3/3 weeks |
| 8 | 1242 | horse manure, 40% | 5/3 weeks |

What is claimed is:

1. A process of decontaminating soil contaminated with PCB contaminant comprising:

(a) preparing an inoculant by making a mixture comprising a minor amount of the contaminant that is contaminating the soil along with soil containing anerobic and aerobic microbes and a highly nutritious heterotrophic medium, and storing said mixture at about 20 degrees C. to 30 degrees C. for sufficient time for acclimation of said microbes to occur and produce viable anaerobic and aerobic microbes capable of transforming the contaminant in the soil to materials that are unobjectionable in said soil in the concentrations present, (b) admixing said soil with organic nutrients for composting said inoculant to form a solid compost mixture comprising from 1 to 20% v/v of said inoculant;

(c) composting said mixture while maintaining the temperature of said compost mixture in the range of about 20–65° C. and a water content of said compost mixture in the range of about 40–100% of water holding capacity;

(d) during said composting maintaining a redox potential level of the compost mixture below about negative 200 mV until said contaminant is partially degraded; and (e) thereafter oxygenating said compost mixture to raise the redox potential level above about positive 100 mV, and maintaining said redox potential level until said contaminant is further degraded.

2. The process of claim 1 wherein said composting is continued until 30–70% of the contaminant is partially dechlorinated.

3. The process of claim 1 wherein said compost mixture contains at least about 10% by weight of said organic nutrients for composting.

4. The process of claim 1 wherein the sequence of steps (b) through (e) are repeated.

5. The process of claim 1 wherein said organic nutrients comprise one or more of agricultural waste and municipal waste.

6. The process of claim 1 wherein a surfactant is added to said compost mixture.

7. The process of claim 1 wherein said temperature is maintained in the range of about 30–55° C.

8. The process of claim 1 wherein said compost mixture contains in the range of 30–70% by weight of said organic nutrients for composting.

9. The process of claim 1 wherein during composting in step (d) the redox potential is maintained in the range of about negative 300 to negative 500 mV.

* * * * *